(12) United States Patent  
Schirmer

(10) Patent No.: US 6,413,595 B1  
(45) Date of Patent: Jul. 2, 2002

(54) MODULAR DISK COEXTRUSION DIE

(75) Inventor: Henry G. Schirmer, Spartanburg, SC (US)

(73) Assignee: BBS Corporation, Spartanburg, SC (US)

( * ) Notice: Subject to any disclaimer, the term of this patent is extended or adjusted under 35 U.S.C. 154(b) by 0 days.

(21) Appl. No.: 09/441,742

(22) Filed: Nov. 16, 1999

Related U.S. Application Data

(60) Division of application No. 08/928,248, filed on Sep. 12, 1997, now Pat. No. 6,000,926, which is a continuation-in-part of application No. 08/735,126, filed on Oct. 22, 1996, now Pat. No. 5,762,971.

(51) Int. Cl.$^7$ .......................... B29C 47/06; B29C 47/20; B29C 47/28
(52) U.S. Cl. ............... 428/34.1; 425/133.1; 425/192 R; 425/380; 220/62.2; 220/23.83; 220/844; 215/12.1; 215/370; 264/96; 264/171
(58) Field of Search .................... 428/34.1; 425/133.1; 264/171, 96; 220/62.2; 215/12.1

(56) References Cited

U.S. PATENT DOCUMENTS 3,759,647 A * 9/1973 Schrenk et al. ............. 425/131  
3,980,744 A * 9/1976 Cogswell ..................... 264/96

OTHER PUBLICATIONS

Schrenk et al, Coextruding Multilayer Blown Film–Part 1, SPE Journal, Jun. 1973 vol. 29.*  
Schrenk et al, Coextruding Multilayer Blown Film–Part 2, SPE Journal, Jul. 1973 vol. 29.*

* cited by examiner

Primary Examiner—Harold Pyon  
Assistant Examiner—Shalie A. Manlove  
(74) Attorney, Agent, or Firm—Pauley Petersen Kinne & Erickson

(57) ABSTRACT

A coextrusion die includes a plurality of annular cells stacked on top of each other. Each annular cell includes a plurality of openings aligned with openings in the adjacent cell, thus forming multiple streams. Plastic melt may be supplied to the die coplanarly. Stacks of annular disks may be joined to form the annular cells through which plastic melt can be axially directed.

7 Claims, 14 Drawing Sheets

MODULAR DISK COEXTRUSION DIE

RELATED APPLICATIONS

This application is a division of Ser. No. 08/928,248, filed Dec. 12, 1997, now U.S. Pat. No. 6,000,926, which is a continuation-in-part of U.S. patent application Ser. No. 08/735,126, filed Oct. 22, 1996, now U.S. Pat. No. 5,762,971, the disclosure of which is incorporated by reference.

FIELD OF INVENTION

The present invention relates to an annular die for extruding thermoplastic materials. More particularly, the present invention relates to a modular assembly including a plurality of thin disks.

BACKGROUND OF THE INVENTION

Annular dies are used to form laminated products from thermoplastic melts (hereinafter "melt"). Conventional annular dies consist of a monolithic structure containing a core mandrel that may contain a spiral groove and axially stacked annular cylinders that concentrically surround the mandrel. Gaps between the mandrel and the innermost cylinder as well as gaps between the innermost cylinder and the next cylinder radially adjacent to it form passages for melt flow. Thus, an increase in the number of melt passages in a conventional die requires an increase in the radial thickness of the die structure. Melt can be supplied to the die both axially and radially through multiple entry openings. Each melt stream then flows axially through the die along the passages, and eventually joins into layers where these passages join within the die, and then finally the melt exits the die at the die lip and is blown into film. The spiral groove that can be provided on the outer surface of the mandrel can assist in controlling both the direction and rate of melt flow.

Several problems have been encountered with the conventional annular die design including deterioration of plastic melt, difficulties in controlling and adjusting temperature of the melt, and inability to maintain uniform film thickness. For example, melt residues may remain in the passages formed by the gaps between the mandrel and the cylinders as well as those between cylinders. These residues may contaminate fresh melt flow and thus deteriorate the quality of films made from the die containing such residues. In addition, removing such residues is extremely labor intensive, particularly because of the small size of the passages and the difficulty of talking the die apart. Thus, melt that stagnates in the die passages shortens the useful life of the die. Furthermore, conventional extruder design dictates that each melt delivered to a die have a separate extruder, thus multiple extruders take up vast amounts of space and clutter work areas.

In addition, it is difficult to produce a laminate product containing film layers made of different materials because the varied temperature requirements of different materials are difficult to meet. Multiple streams of melts are used to produce a laminate product, and each stream may require a different temperature depending on the properties of the melt material in the stream. For example, one melt may have a higher melting point or different thermal properties than another melt flowing within the die. Since the annular cylinders are concentrically arranged in the conventional die, it is difficult to control the temperature of the different melts axially flowing along the cylinders, because temperature is controlled by applying heat in a radial direction from the outer periphery of the die. Since the number of concentric cylinders surrounding the core is increased to form multi-layered films, the peripheral heating system makes it difficult to apply the proper heat to plastic melt that is flowing along the inner cylinders of the die.

Furthermore, the axial height resulting from the monolithic die design may produce inconsistent film thickness. Producing a laminate with an increased number of laminate layers using a conventional die not only requires more concentric cylinders that increases radial thickness but also increased axial height to join the melt passages within the die. Inconsistencies in the thickness of extruded film may result because increased axial height makes the die susceptible to thermal expansion, leading to inclining of the die.

U.S. Pat. No. 5,076,776 issued to Yamada et al. discloses an annular coextrusion die for a lamination product. The die consists of stacked annular plate-like rings with one opening in the center of the ring. Each plate-like ring has a number of manifolds cut into it that spiral inward. In operation, melt flows through an entry flow area adjacent to the center opening in each plate-like ring. A gap exists between the manifolds, and the melt overflows this gap to the next manifold. The center opening of the plate-like rings form a gap with the core mandrel creating an axial melt passage. The melt is thereby directed from the melt opening on the radial periphery of the plate-like ring through the manifolds, across the entry flow area into the melt passage and out through the die lip.

The die disclosed in Yamada et al. still requires labor-intensive die manufacture to produce the spiral manifolds of various thickness. In addition, the manifolds that are cut into plate-like rings require that these rings have a tangible thickness, which contributes to the overall axial height of the die. Furthermore, the melt residue problem associated with the conventional annular die remains an issue with this die design.

SUMMARY OF THE INVENTION

The present invention is directed to an extrusion die along with its extrusion system, including a coextrusion die. In one embodiment a die for coextruding at least one resin material to produce a plurality of laminate layers includes a modular disk assembly of a plurality of cells that include a plurality of thin annular disks stacked on top of each other (and thus axially adjacent to each other), wherein each of the annular disks have an inner radius and an outer radius. Each annular disk also includes a plurality of radially disposed openings between the inner and outer radii. Axial alignment of these openings form resin passages through the modular disk assembly such that all of the resin material can be coplanarly supplied from the inlet end of the modular disk assembly. In a preferred embodiment, melts are delivered to the die with a system that operates at a fixed ratio of screw speed and delivers multiple melt streams to the die through sets of inlet openings which are spaced at 90° around the die.

In a preferred embodiment, the die includes a modular disk assembly that includes at least one cell of a plurality of axially adjacent thin annular disks. Each cell includes at least one first cap disk that includes a plurality of cap inlet openings, at least one distribution disk that includes a plurality of distribution inlet openings, one of the distribution inlet openings also being a selection inlet port, a continuous channel connected to the selection inlet opening, and a plurality of distribution outlet openings terminating the continuous channel cavity. Each cell further includes at least one second cap disk including at least one flow regulation point aligned with at least one of the distribution inlet openings, and a plurality of cap outlet openings that are aligned with the distribution outlet openings. Each cell also includes at least one spacer disk that includes a plurality of spacer inlet ports that are aligned with distribution inlet ports, a flow region connected to a plurality of flow ports, that are aligned with the cap outlet openings. In one embodiment, the die is an outward flow die. In another embodiment, the die is an inward flow die.

In another preferred embodiment of the invention, a unitary component comprising the at least one distribution disk, the at least one second cap disk and the at least one spacer disk is machined from a single piece of material. Other permanent connections may permanently join similar groups of disks to form a similar unitary component. Only the at least one first cap disk is added to this unitary component to complete the cell.

In a preferred embodiment of the invention, the entire modular assembly is disposable and can be replaced quickly by a clean preassembled assembly that is bolted, glued or welded together. The low cost of the modular assembly allows complete replacement modules, thereby saving downtime caused by cleaning difficulties. In addition, the minimal thickness of the disks in the module lends itself to producing a multiple layer product with a die that is much less massive than conventional dies. In addition, a plurality of commonly driven extruders is preferably used to deliver the melt material to the modular assembly. This extruder system design takes up less space than conventional systems.

DETAILED DESCRIPTION OF THE PREFERRED EMBODIMENT

The present invention relates to a die including a plurality of thin disks that can be used to extrude or coextrude resin materials. Although the specification specifically describes blown films, the die according to this invention may also be used to create a coextruded tube, such as a hose, a coextruded rod formed from multiple continuous layers of material to create a generally solid rod structure, or parison (a generally elliptical uninflated tube used in blow molding).

Figure 1:
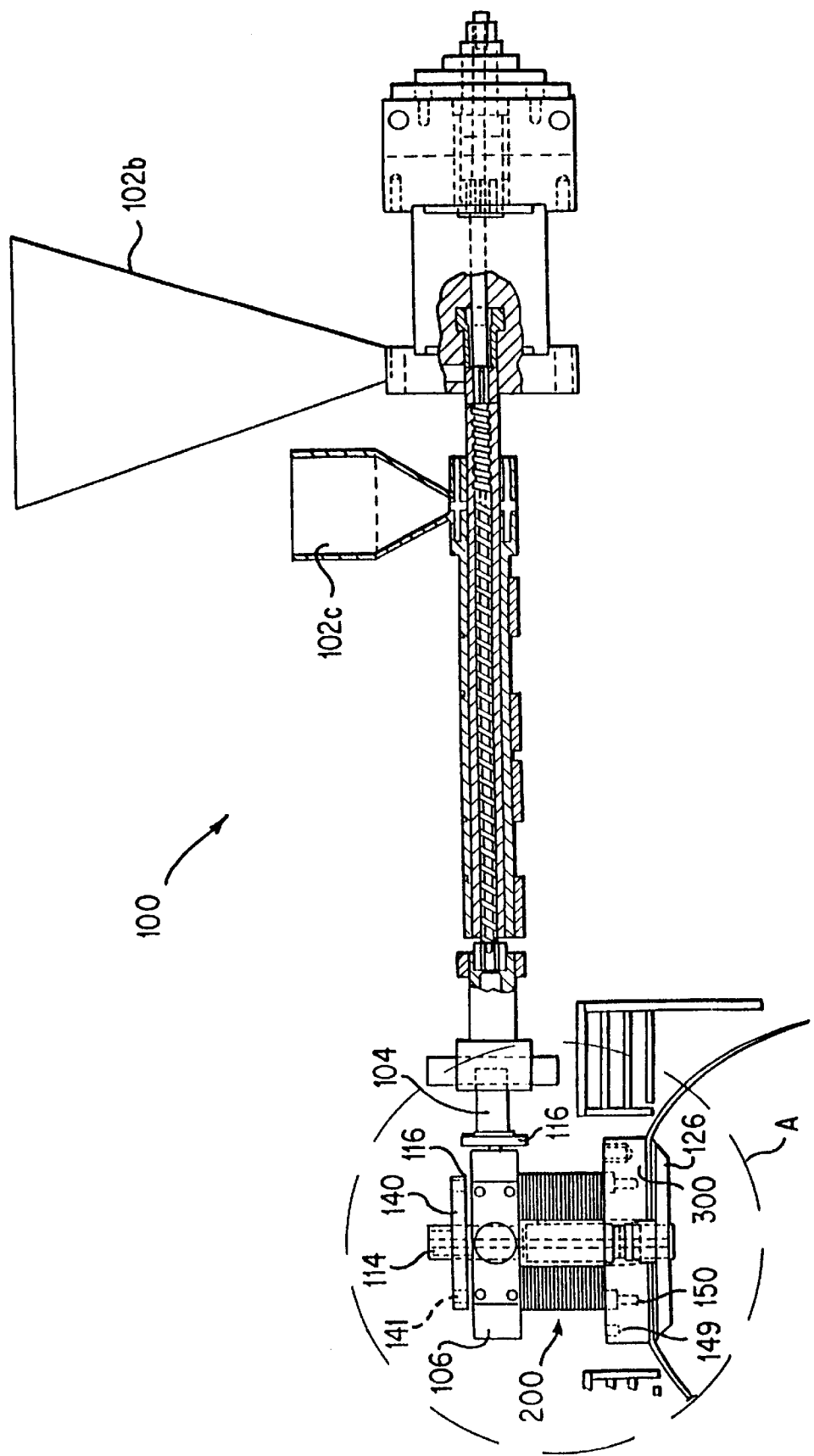
FIG. 1 shows a cross-sectional view of a coextrusion device with three extruders employing a die of the present invention.
Figure 2:
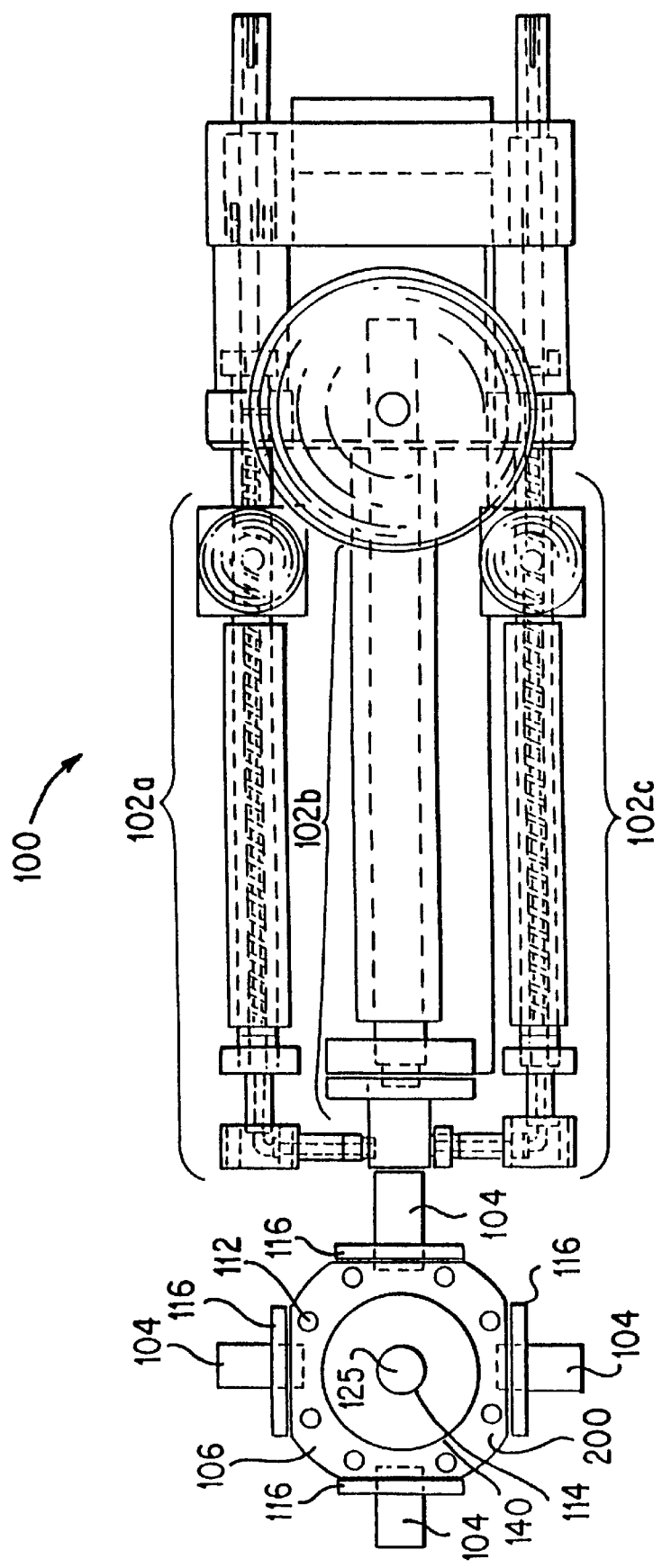
FIG. 2 shows a top plan view of the assembly shown in FIG. 1

Referring now to FIGS. 1–2, the present invention may be used in a coextrusion device 100 with a central extruder delivery system 102b and two satellite extruder delivery systems 102a, 102c and employing a die 200 of the present invention. Extruder delivery systems 102a, 102b, 102c are driven by a common drive. Alternatively, these extruder delivery systems may be individually driven. The illustrated three extruders may have screw diameters of 0.75 inches, 1.25 inches, and 0.75 inches respectively, and may operate at a fixed ratio of screw speed of 1.116 to 1.0 to 1.116. As best shown in FIG. 2, the coextrusion device 100 forms a laminated product from three resin or melt streams, designated as streams a, b and c, so that extruder system 102a delivers resin stream a, extruder system 102b delivers resin stream b and extruder system 102c delivers resin stream c. Four sets of three inlet openings are spaced at 90° relative to the adjacent sets.

Figure 3:
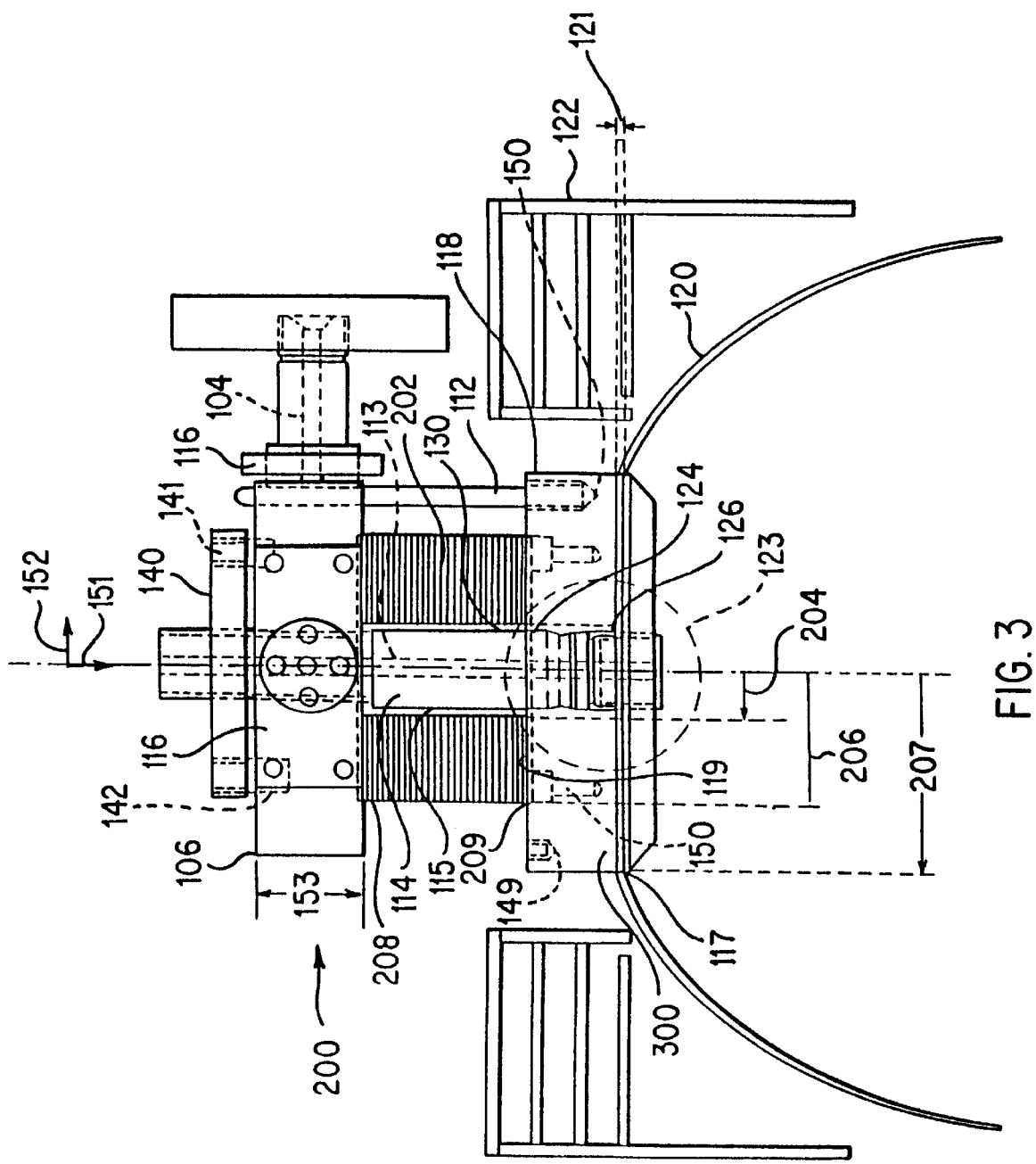
FIG. 3 shows an enlarged view of the designated portion A of FIG. 1.

As generally shown in FIG. 3 and described in more detail below, the die 200 includes an inlet plate 106, a threaded attachment plate 116 joining the extruder extension 104 to the inlet plate 106, a disk module or modular disk assembly 202 with a first end 208 and an opposite second end 209 and an outlet plate 118.

Die 200 also includes an inlet plate 106 that includes four die ports (not shown) which are recessed along the axial thickness 153 of the inlet plate 106. Each die port receives a threaded attachment plate 116 disposed within each die port. An extruder extension 104 delivers the three resin streams a, b, c up to one inlet plate 106. As best shown in FIG. 2, the illustrated die 200 contains four die ports and thus allow up to twelve resin streams to be delivered to the die 200.

Figure 7:
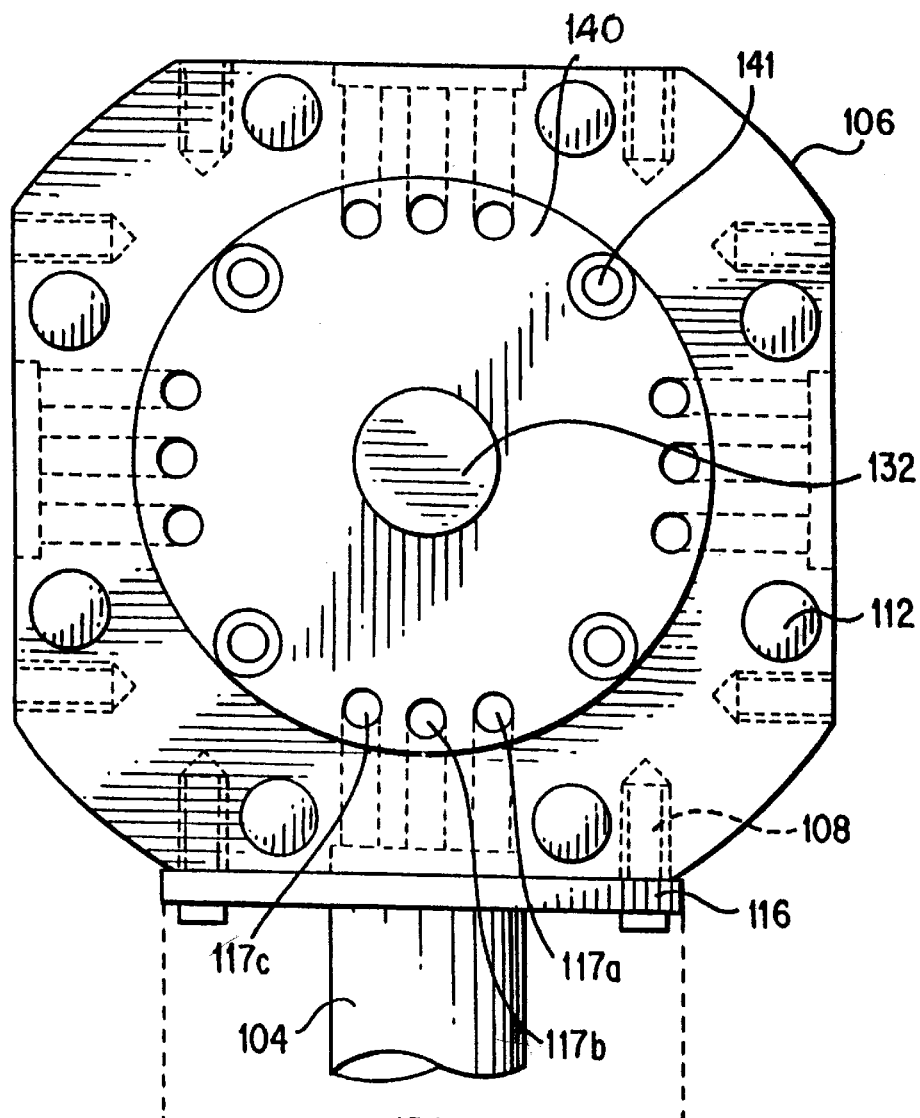
FIG. 7 shows an inlet plate that can be connected to the assembly shown in FIG. 4.
Figure 8:
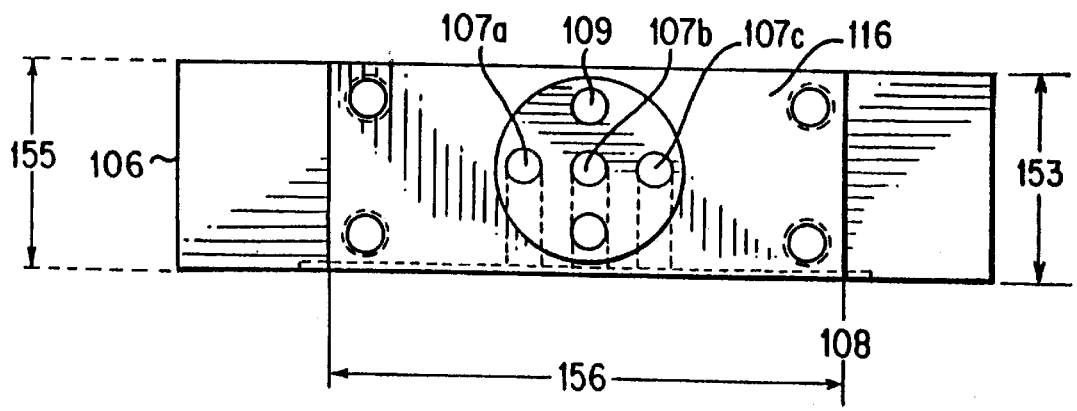
FIG. 8 shows a three-melt threaded attachment plate that is connected to the inlet plate shown in FIG. 7.

As best shown in FIGS. 7–8, the inlet plate 106 directs melt streams a, b, c through melt holes 107a, 107b, 107c to the threaded attachment plate 116. Threaded plate bolts 108 secure the inlet plate 106 with the threaded attachment plate 116. Two pin holes 109 can be used to align the melt holes 107a, 107b, 107c to the extruder extension 104. The threaded attachment plate 116 attaches the melt streams to the modular disk assembly 202 component of die 200 through inlet holes 117a, 117b, 117c in the inlet plate 106. Preferably, the inlet plate 106 has an axial thickness 153 to essentially accommodate the width 155 of the threaded attachment plate 116. Also preferably, the inlet plate 106 has an edge width 154 that accommodates the length 156 of the threaded attachment plate 116.

As best shown in FIG. 3, die 200 further includes the modular disk assembly or disk module 202. The modular disk assembly 202 is an annular assembly having an overall inner radius 204 and an overall outer radius 206. The modular disk assembly 202 surrounds a mandrel 114, which has a radius (not shown) that is smaller than the overall inner radius 204 such that an annular resin passage 115 is formed between the modular disk assembly 202 and the mandrel 114. As best shown in FIGS. 3, 7, the mandrel 114 is a cylindrical rod with a hollow center 113. In addition, the mandrel includes a mandrel stem 124 and a mandrel tip 126. The die 200 further includes an outlet plate 118 with a disk end 119 that abuts the modular disk assembly 202 and an opposite exit end 117. The mandrel stem 124 extends through this outlet plate 118 such that it protrudes out on the exit end 117. The mandrel tip 126 is secured to the mandrel stem 124 adjacent to the exit end 117 of the outlet plate 118 such that a gap 121 is formed between the mandrel tip 126 and the exit end 117. Although the size of the mandrel 114 is not crucial to the present invention, the mandrel tip 126 preferably has a radius of about one to five inches. The size of the gap 121 may be varied by using, for example a screw and lock nut design 123 on the mandrel stem 124. As best shown in FIGS. 2, 3, and 7, eight die bolts 112 secure the inlet plate 106 with the outlet plate 118. The mandrel 114 is held by the adjusting plate 140 and aligned with four mandrel bolts 141 that are pressed against the inlet plate 106. Each mandrel bolt 141 is received by a mandrel bolt hole 142. Die bolt holes 150, which are spaced around the outlet plate 118, receive the die bolts 112. Each die bolt hole permits free clearance of the eight bolts 112 holding the modular disk assembly. A thermocouple well 149 receives a thermocouple for measuring die temperature (not shown).

Figure 6:
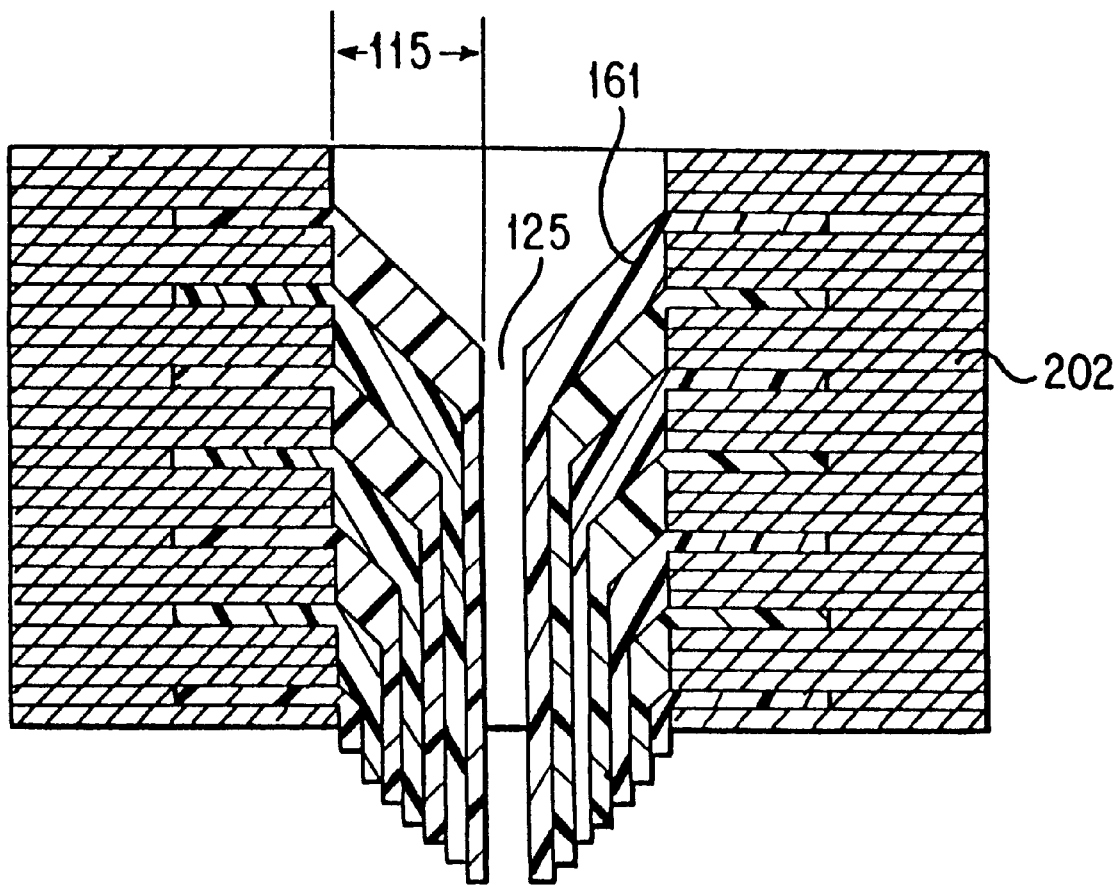
FIG. 6 shows a schematic representation of the annular exit melt flow within the modular disk assembly shown FIG. 4.

In operation, resin streams a, b, c are fed to the die 200 through extrusion extension 104 and is directed to inlet plate 106, as best shown in FIG. 3. The resin streams are then directed to the modular disk assembly 202 via the threaded attachment plate 116 and inlet plate 106. The melt streams a, b, c are thus fed in a coplanar fashion to the modular disk assembly and directed through the modular disk assembly 202 in the axial direction 151 as well as the radial direction 152, depending upon the flow path provided by the disk components, described in greater detail below, that make up the modular disk assembly 202. The modular disk assembly 202 forms one or more layers of blown film 120 from each melt stream. As illustrated and described in greater detail below, the illustrated modular disk assembly 202 forms seven layers of blown film 120 from the three melt streams a, b, c. In general, the modular disk assembly 202 forms these layers by sequentially selecting a melt stream one or more times as the melt streams a, b, c travel in the axial direction 151 through the modular disk assembly 202. Melt from a selected melt stream (not shown) is then directed to the annular resin passage 115. Melts flowing in the annular resin passage are hereinafter referred to as exit melts 161. The pattern of seven exit melt flows 161 from the modular disk assembly 202 to the annular resin passage 115 is best shown in FIG. 6. The annular resin passage 115 directs the melt out of the modular disk assembly 202. The annular exit die tube 300 directs the exit melt out of the die 200. Blown film 120 is formed as it exits die 200 and is cooled by air rings 122. The form of the blown film 120 is maintained by air blown through the hollow center 113 of the mandrel 114. In another preferred embodiment of this invention, a tube or a rod may be formed from multiple layers of material directed out of the die 200.

Figure 4:
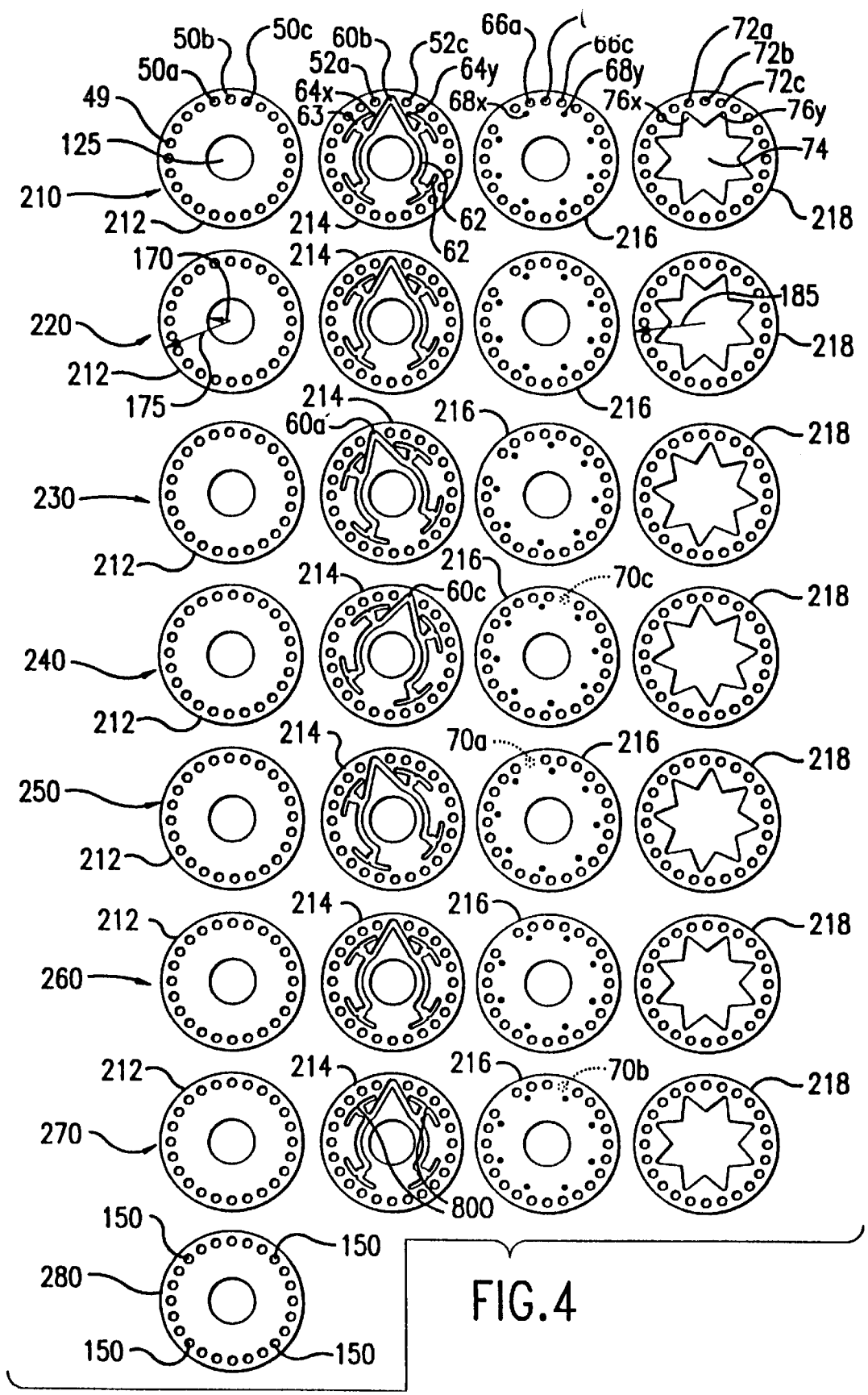
FIG. 4 shows a side-by-side line up of disks, including a first embodiment of a distribution disk, in a seven-cell annular flow modular disk assembly in accordance to the present invention using three melt feeds.

The modular disk assembly 202 will now be described in greater detail. As best shown in FIG. 4, the modular disk assembly 202 is made up of seven cells 210, 220, 230, 240, 250, 260, 270. Each cell produces one laminate layer. Each cell is preferably made up of four thin annular disks: a first cap disk 212, a distribution disk 214, a second cap disk 216 and a spacer disk 218. Each disk has an axial thickness (not shown) of preferably less than one inch. These disks are stacked in the axial direction 151 of the modular disk assembly 202.

In another embodiment of the invention, a unitary component (not shown) comprising the distribution disk 214, the second cap disk 216 and the spacer disk 218 is machined from a single piece of material. Only the first cap disk 212 is added to this unitary component to complete the cell.

Figure 5:
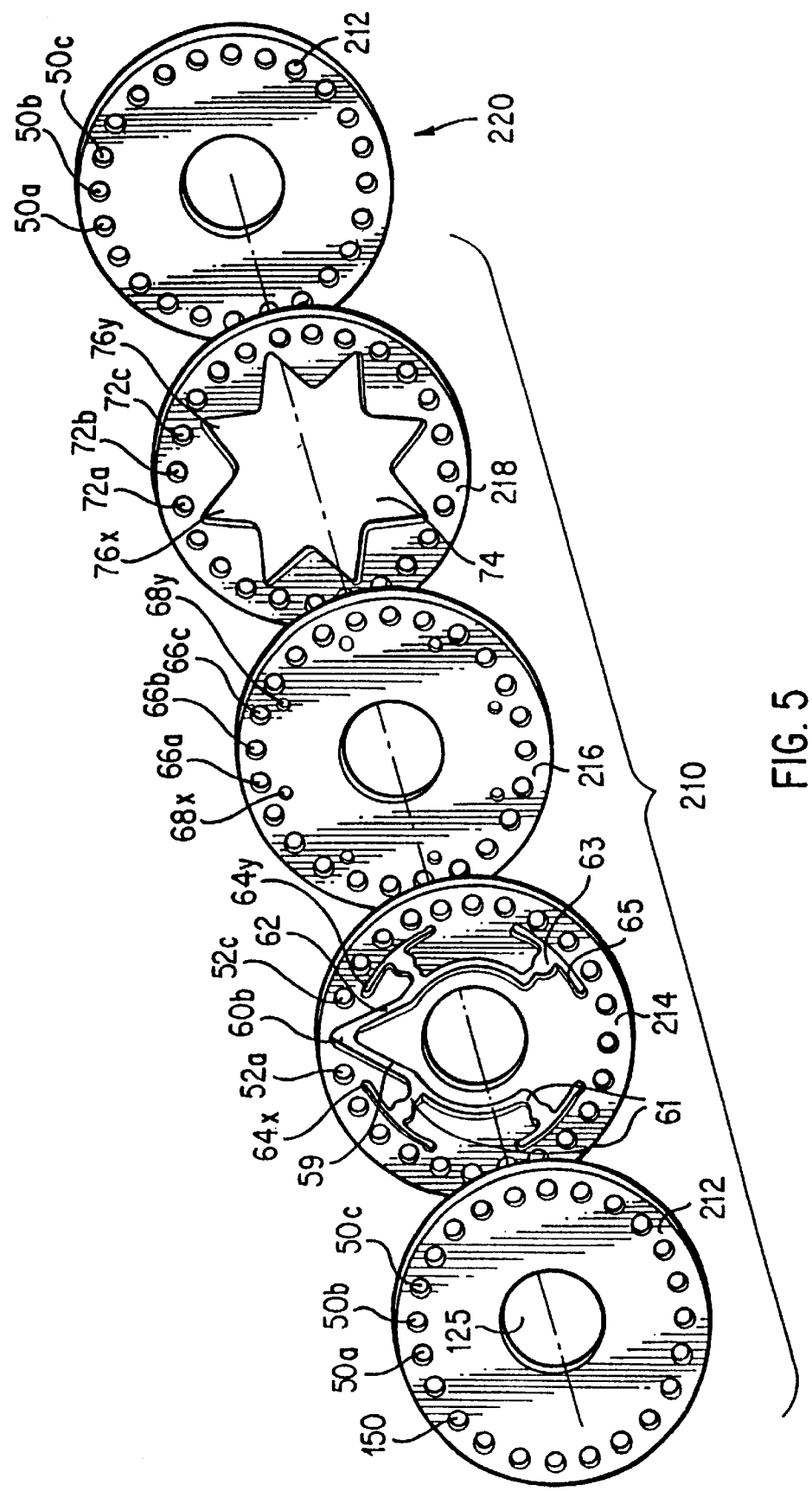
FIG. 5 shows an exploded perspective view of aligned disks of the first cell of the assembly shown in FIG. 4.

As best shown in FIGS. 4–5, the first cap disk 212 can have 24 inlet openings 49 arranged in eight sets of three openings 50a, 50b, 50c. In the embodiment shown, only one set of three is used. Each set is disposed at an angle relative to the adjacent sets. As explained in greater detail below, resin streams are supplied to the die 200 through these sets of cap disk inlet openings 50a, 50b, 50c that extend through the first cap disk 212. Thus, the illustrated design allows three, six, twelve, or even twenty-four resin streams to be supplied to die 200 depending on how many sets are used. In other embodiments (not shown), each set may. contain fewer or more than three inlet openings, and each cap disk may contain more or less than eight sets. For example, a cap disk may contain two sets of six inlet openings in rows of three so that up to 24 melt streams can be delivered to the die. For illustration purposes, the design of modular disk assembly 202 is shown to produce a seven-layer laminate product using three resin streams, designated as streams a, b and c. Thus, for example, as used herein, inlet opening 50a is an inlet opening for resin stream a, while inlet opening 50b is an inlet opening for resin stream b and inlet opening 50c is an inlet opening for resin stream c. These stream designations also apply to openings in the remaining annular disks described below. Thus, the modular disk assembly 202 is shown with all but three of the inlet openings 49 being unused.

The distribution disk 214 is axially adjacent to the first cap disk 212. When a first disk is "axially adjacent" to a second disk, it is meant that the first disk is axially or vertically closest to the second disk, as shown in FIG. 3. The distribution disk 214 of the first cell 210 includes distribution inlet openings 52a, 52c, that extend through the distribution disk 214 and are axially aligned with the respective cap disk inlet openings 50a, 50c. Cap disk inlet opening 50b of the first cell 210 is axially aligned with selection port 60b, that extends through the distribution disk 214. Selection port 60b is connected to a continuous channel 62 that also extends through the distribution disk 214. This continuous channel terminates at a plurality of distribution outlet openings 64x, 64y. By the terms "port" or "channel," it is meant that the described portion is an opening in the disk such that the portion penetrates or extends through the entire axial thickness of the disk.

The illustrated distribution disk 214 in FIGS. 3–4 contains eight distribution outlet openings 64x, 64y, that extend through the distribution disk 214. Each opening 64x, 64y is disposed at an angle, for example, of 45°, relative to the adjacent distribution outlet openings. The axial alignment of the selection port with respect to the cap inlet openings 50a, 50b, 50c determines the resin stream from which a laminate layer is formed by that particular cell. Thus, for example, the distribution disk 214 of the first cell 210 is aligned so that a laminate layer is formed with resin stream b. Similarly, because selection port 60a in the third cell 230 is aligned with cap inlet opening 50a, third cell 230 is aligned to form a laminate layer from stream a. Therefore, the modular disk assembly 202 is made up of cells that form seven laminate layers from resin streams a, b and c in the following order: b, b, a, c, a, b, b. It should be understood that, as with the first cap disk 212, the distribution disk 214 can have four sets of distribution inlet openings, each disposed at 90° relative to the adjacent sets. As best shown in FIG. 5, channel 62 may include a first split channel 59, a second split channel 61, a relief zone 63, and a third split channel 65. Preferably, the split channels symmetrically divide the melt selected by the selection port 60b ("selected melt") (not shown). More particularly, each first split channel 59 preferably directs about one-half of the amount of the selected melt from the selection port 60b to its adjacent two second split channels 61. Similarly, each second split channel 61 directs one-half of the amount of selected melt from the first split channel 59 to its adjacent third split channels 65. A relief zone 63 is preferably provided to allow a momentary rest of the selected melt flow before it flows into the third split channels 65. As previously described, one of eight distribution outlet openings 64 terminates each end of the third split channels 65. The split channels thus preferably split the selected melt stream until its flow geometry becomes annular. Although not wishing to be bound by theory, it is postulated that, the geometry of the selected melt stream may govern actual thickness and uniformity of thickness of the extruded layer.

The second cap disk 216 is axially adjacent to the distribution disk 214. The second cap disk 216 includes flow regulation points 66a, 66b, 66c, which, in the first cell 210, are axially aligned with the respective distribution inlet openings 52a, 52c and selection port 60b. The second cap disk 216 also includes cap outlet openings 68x, 68y, which are axially aligned with the respective distribution outlet openings 64x, 64y. The second cap disk 216 is designed to direct the selected resin stream to the spacer disk 218. In addition, the second cap disk 216 also directs the unselected resin stream(s) to the next cell. Moreover, the second cap disk 216 may terminate a resin passage. For example, the second cap disk 216 of the first cell 210 directs stream b to the spacer disk 218 via the cap outlet openings 68x, 68y. In addition, the flow regulation points 66a, 66b, 66c in the first cell 210 are inlet openings to the second cell 220, so that the second cap disk 216 of the first cell 210 directs all three resin streams to the second cell 220. In contrast, the flow regulation point that is aligned with selection port 60c in the fourth cell 240 is a termination point 70c that terminates the resin passage of resin stream c. Similarly, the resin passage of resin stream a is terminated in the fifth cell 250 by termination point 70a, and the resin passage of resin stream b is terminated in the seventh cell 270 by termination point 70b.

The spacer disk 218 is axially adjacent to the second cap disk 216. The spacer disk 218 includes spacer inlet openings 72a, 72b, 72c that are axially aligned with the respective flow regulation points 66a, 66b, 66c. The spacer disk 218 additionally includes flow ports 76x, 76y that are axially aligned with the respective cap outlet openings 68x, 68y. A flow region 74 is shown to have a configuration of an eight-point star. The flow region 74 is connected to the flow ports 76x, 76y, which are the eight points of the eight-point star. In FIGS. 3–4, the illustrated flow region 74 is a cavity that extends through the entire axial thickness of the spacer disk 218. The spacer disk 218 is designed to receive the selected melt from the second cap disk 216 at flow ports 76x, 76y, allow the selected melt to fill the flow region 74 and direct the selected melt to the annular passage 130.

Figure 15:
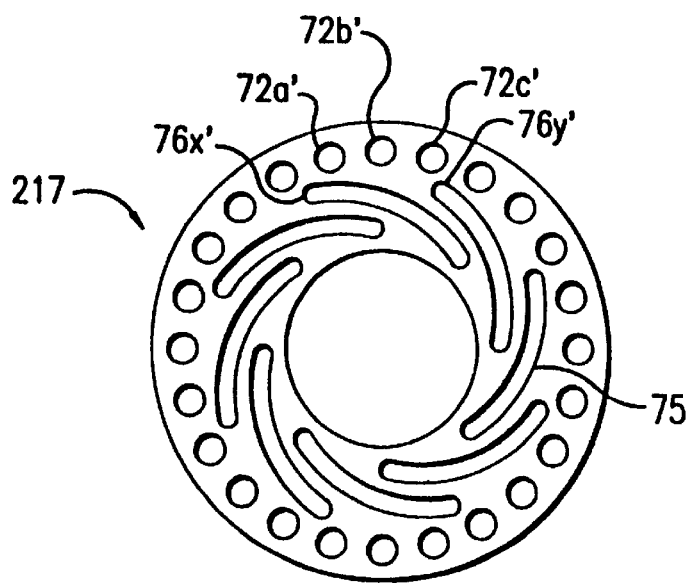
FIG. 15 shows a top view of a spiral overflow disk design that can be used in one embodiment of the modular disk assembly.
Figure 16:
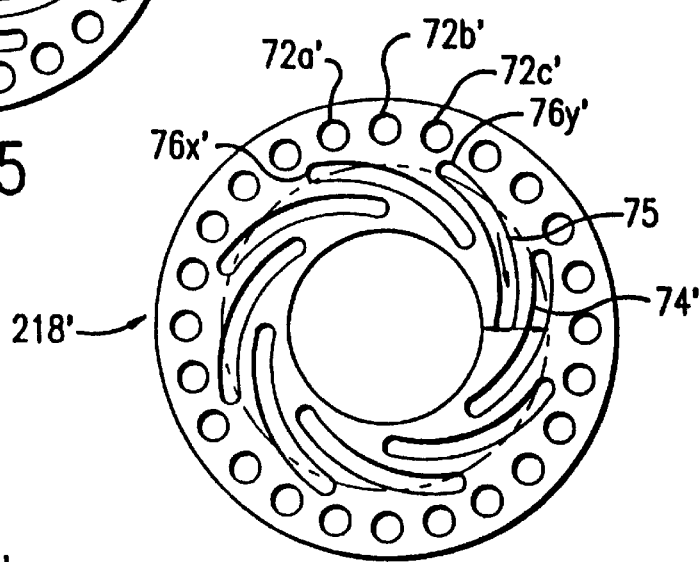
FIG. 16 shows a top view of a composite of the disks shown in FIG. 15 and FIG. 17.
Figure 17:
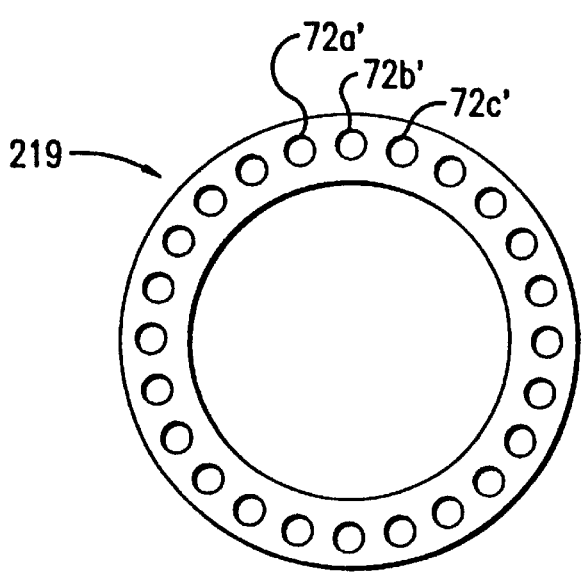
FIG. 17 shows a spiral overflow spacer that is used to define a spiral overflow region.

In another preferred embodiment of the subject invention, a composite spacer disk 218' may comprise a spiral overflow design as shown in FIG. 16. The composite spacer disk 218' may replace the spacer disk 218 shown in FIG. 4. The composite spacer disk 218' includes spacer inlet openings 72a', 72b', 72c' that are axially aligned with the respective flow regulation points 66a, 66b, 66c (shown in FIG. 4). The spacer disk 218' additionally includes flow ports 76x', 76y' that are axially aligned with the respective cap outlet openings 68x, 68y (shown in FIG. 4). An overflow region 74' is shown in addition to a deeper channel of a spiral flow region 75. The overflow region 74' and a spiral flow region 75 are connected to the flow ports 76x', 76y', which are the starting flow points of each of eight spiral flow regions 75 formed with respect to the composite spacer disk 218'. In FIG. 16, the illustrated flow region 74' is a cavity defined by the inner diameters of the spiral disk 217 shown in FIG. 15 and the overflow spacer 219 shown in FIG. 17. The spiral disk 217 may combine with the overflow spacer 219 to form the flow region 74' shown in the composite spacer disk 218' in FIG. 16. The composite spacer disk 218', like the spacer disk 218 shown in FIG. 4, is designed to receive the selected melt from the second cap disk 216 (shown in FIG. 4) at flow ports 76x', 76y', allow the selected melt to fill the spiral channels 75 and into overflow region 74' and direct the selected melt to the annular passage 130. Such a spiral overflow design assists in spreading out melt join lines over a broader area than the star configuration of the spacer disk 218, shown in FIG. 4. The composite spacer disk 218' could also be machined from a single piece of material or welded from a group of disks such as those shown in FIGS. 15 and 17.

Figure 18:
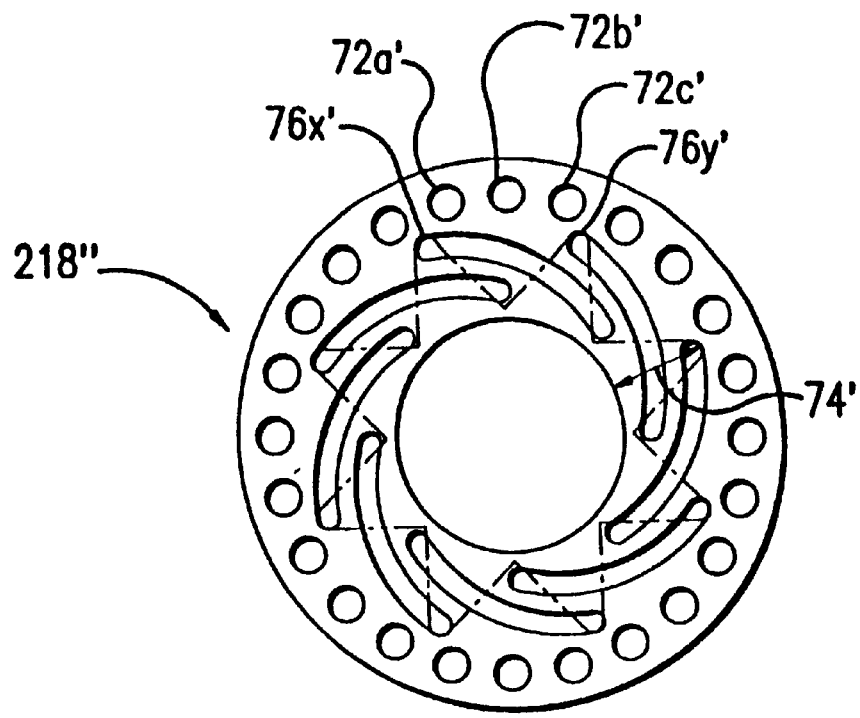
FIG. 18 shows a top view of a composite of the disks shown in FIG. 15 and FIG. 19.
Figure 19:
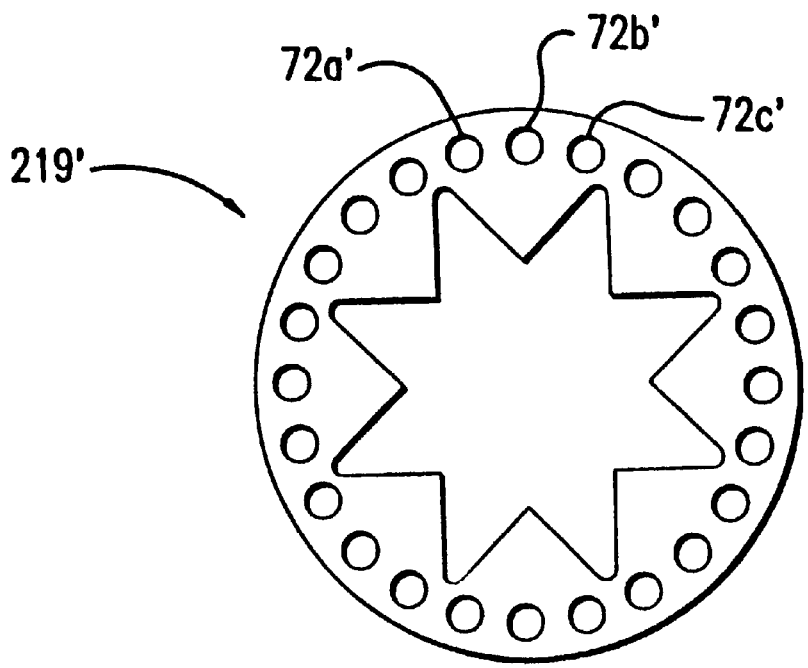
FIG. 19 shows a star-shaped overflow spacer that is used to define another spiral overflow region.

In another, similar, preferred embodiment of the subject invention, a composite spacer disk 218" may comprise a spiral overflow design as shown in FIG. 18. The composite spacer disk 218" may replace the spacer disk 218 shown in FIG. 4. In FIG. 18, the illustrated flow region 74' is a cavity defined by the inner diameter of the spiral disk 217 shown in FIG. 15 and the inner region defined by the eight-point star in the overflow spacer 219' shown in FIG. 19. The configuration of the overflow spacer 219' shown in FIG. 19 is very similar to the spacer disk 218 shown in FIG. 4. However, in this embodiment the spiral disk 217 combines with the overflow spacer 219' to form the flow region 74' shown in the composite spacer disk 218" in FIG. 181.

As best shown in FIG. 4, the disks 212, 214, 216 may have an inner radius 170 and an outer radius 175 that is equal to the overall inner 204 and outer 206 radii of the modular disk assembly 202. Similarly, the spacer disk 218, 218' in each cell may have an outer radius 185 that is equal to the overall outer radius 206. The modular disk assembly 202 also includes a third cap disk 280 adjacent to the spacer disk 218 in the last cell 270. Cap disk 280 provides an end plate to the cells so that the entire assembly 202 may be secured together to act as a self-contained and replaceable unit within the die 200.

The disks making up the modular disk assembly can be made of any material suitable for use in a coextrusion die. Suitable materials include, for example, ceramic, plastic or metallic materials that can withstand a welded attachment or the clamping pressure of the securing means such as the die bolts 112 and mandrel bolts 141 and that do not chemically or thermally react with the melts being processed. Preferably the disks comprise a material that facilitates easy and inexpensive manufacture of the disks themselves. A preferred disk may comprise, for example, metallic materials such as steel and aluminum. More preferably, each disk has smooth surfaces so that a surface from a disk intimately abuts a surface from an axially adjacent disk. Such intimate contact will ensure that melt streams flowing through the modular disk assembly 202 are properly directed and without leaking. Where poor surface quality disks are being used it is preferable that the disks are secured together by glue or welds to reduce leaking.

The cells in the modular disk assembly 202 are secured by disk bolts (not shown), these bolts can be inserted in a plurality of unused melt holes such as those aligned with inlet openings, if available. Alternatively, dedicated holes (not shown) in each disk specifically made for the disk bolts can also be provided. However, these dedicated holes are preferably placed such that the disk bolts would not interfere with the melt flow, for example, in the channels in the distribution disk 214 or the flow region 374 of the spacer disk 218. Also, as previously mentioned, other securing means such as for example, glue, may be used. In a preferred embodiment, each disk within each cell can be glued to the axially adjacent disks and finally to a cap disk 216. Any glue material suitable for securing the material making up the disks may be used so long as the processed melt streams do not chemically react with the glued materials. An example of acceptable glue material for metallic disks including steel and aluminum (specifically product number DK-175-022A), is an inorganic polymer ceramic glaze from Cerdec Corporation of Washington, Pa.

In another preferred embodiment, disks within a cell may be permanently joined together. One such means of permanently joining disks within a cell together is with spot welds between abutting surfaces of adjacent disks. Specifically, two or more of the distribution disk 218, the second cap disk 216 and the spacer disk 218 may be connected with respect to each other with spot welds. Such welding eliminates possible errors made during module assembly because the disks within each cell cannot be transposed or omitted entirely from the modular disk assembly 202. In one embodiment wherein the distribution disk 218 is welded to the second cap disk 216 and the second cap disk 216 is welded to the spacer disk 218, only the first cap disk 212 is separable. In one preferred embodiment, two or more distribution disks 218 may be welded, or otherwise permanently joined, together to increase the overall thickness of the cell and/or distribution disk 218.

Other means of welding known to those having ordinary skill in the art, such as braze welding, may be used to join two or more disks within a cell. A preferred weld would permit grinding disk surfaces smooth following placement of the weld. Multiple cells may also be welded together to firer ensure reliable and high speed assembly of the modular disk assembly 202.

In yet another preferred embodiment, each cell or group of two or more disks can be machined from a single piece of material. Like a welded group of disks, a single-piece machined cell creates a permanent connection among groups of disks and would eliminate errors made during module assembly because the single-piece machined cell would prevent an accidental interchange of adjacent disks.

The die of the present invention illustrated in FIGS. 1–8 is an inward flow die, since melts are directed radially inward towards the mandrel 114 to form the blown films 120. Another embodiment of the inward flow die (not shown) may not employ a mandrel 114. When the mandrel is not used the exit melt 161 is extruded into a solid laminate rod, whereas the use of the mandrel causes the melt to be blown into a hollow tube. The extrusion of a solid laminate rod (not shown) may also be useful to extrusion coat objects such as a wire which is passed through the hollow center 125 of the inward flow die. This is accomplished by removing the mandrel, inserting the object to be coated into the hollow center 125 from the top end such that the annular exit melt passage is formed between the object and the modular assembly, and passing the object through the center 125. The melt is simultaneously delivered into the modular disk assembly and directed through the exit melt passage whereupon the melt contacts and coats the object as it passes through.

Figure 9:
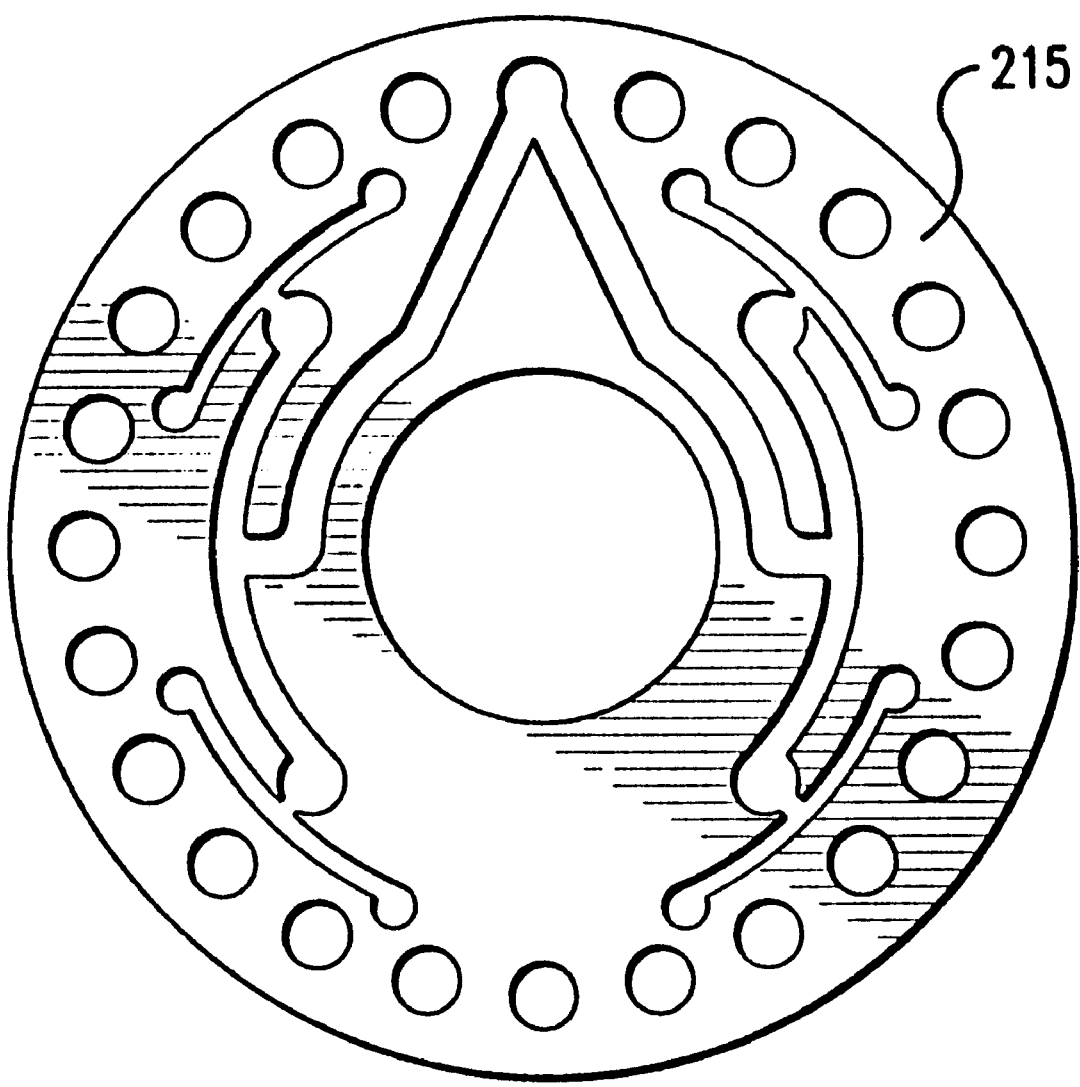
FIG. 9 shows another embodiment of the distribution disk in accordance to the present invention.

FIG. 9 shows another configuration for the distribution disk 215 that can be used in an inward flow die of the present invention. The pattern stamped into the disk shown in FIG. 9, facilitates a more symmetrical division of the selected melt and thereby resulting in more uniform layer thickness in the laminate.

Figure 10:
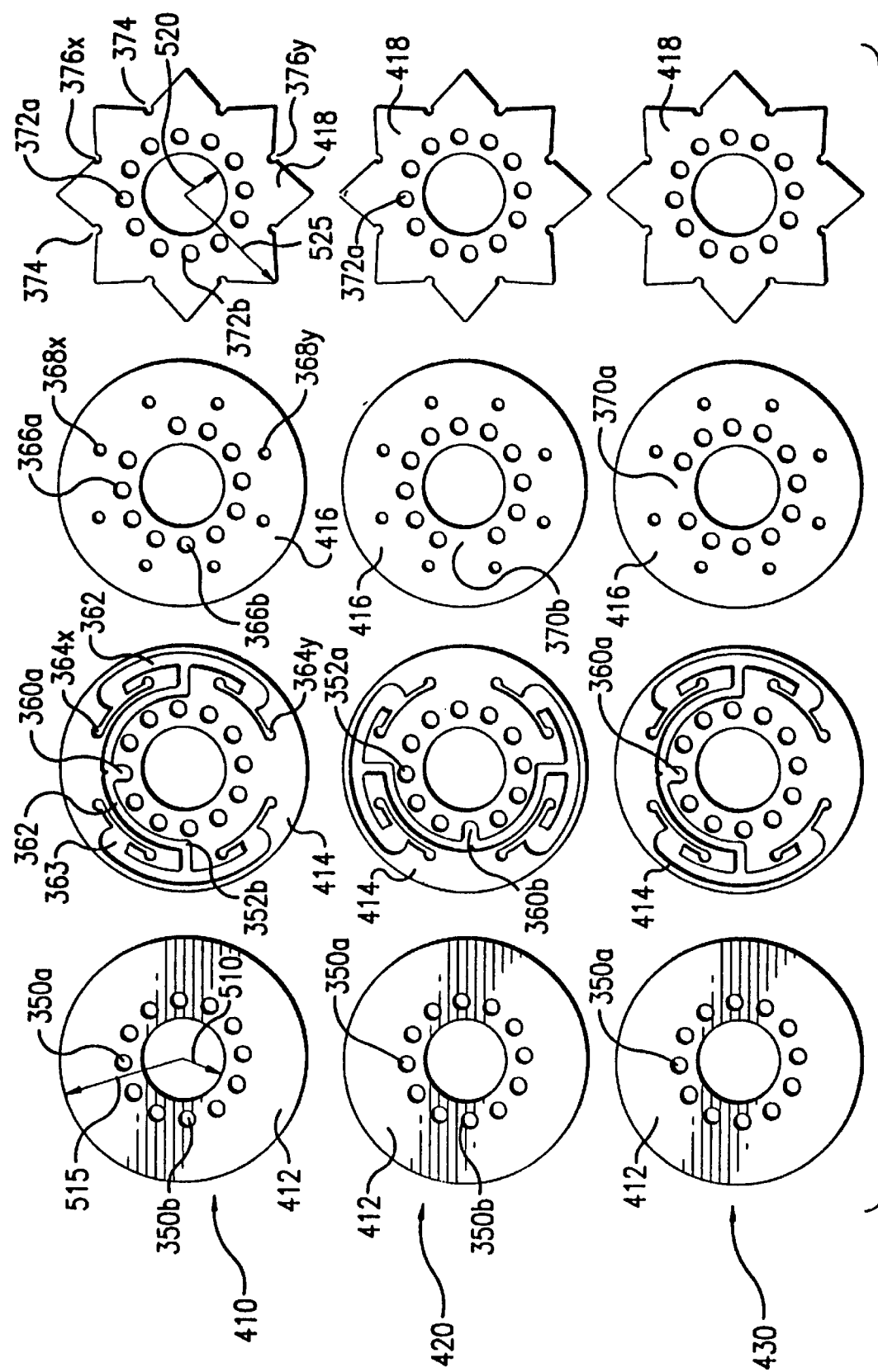
FIG. 10 shows a side-by-side line up of aligned disks in a two melt three-cell outward flow modular disk assembly in accordance to the present invention.
Figure 11:
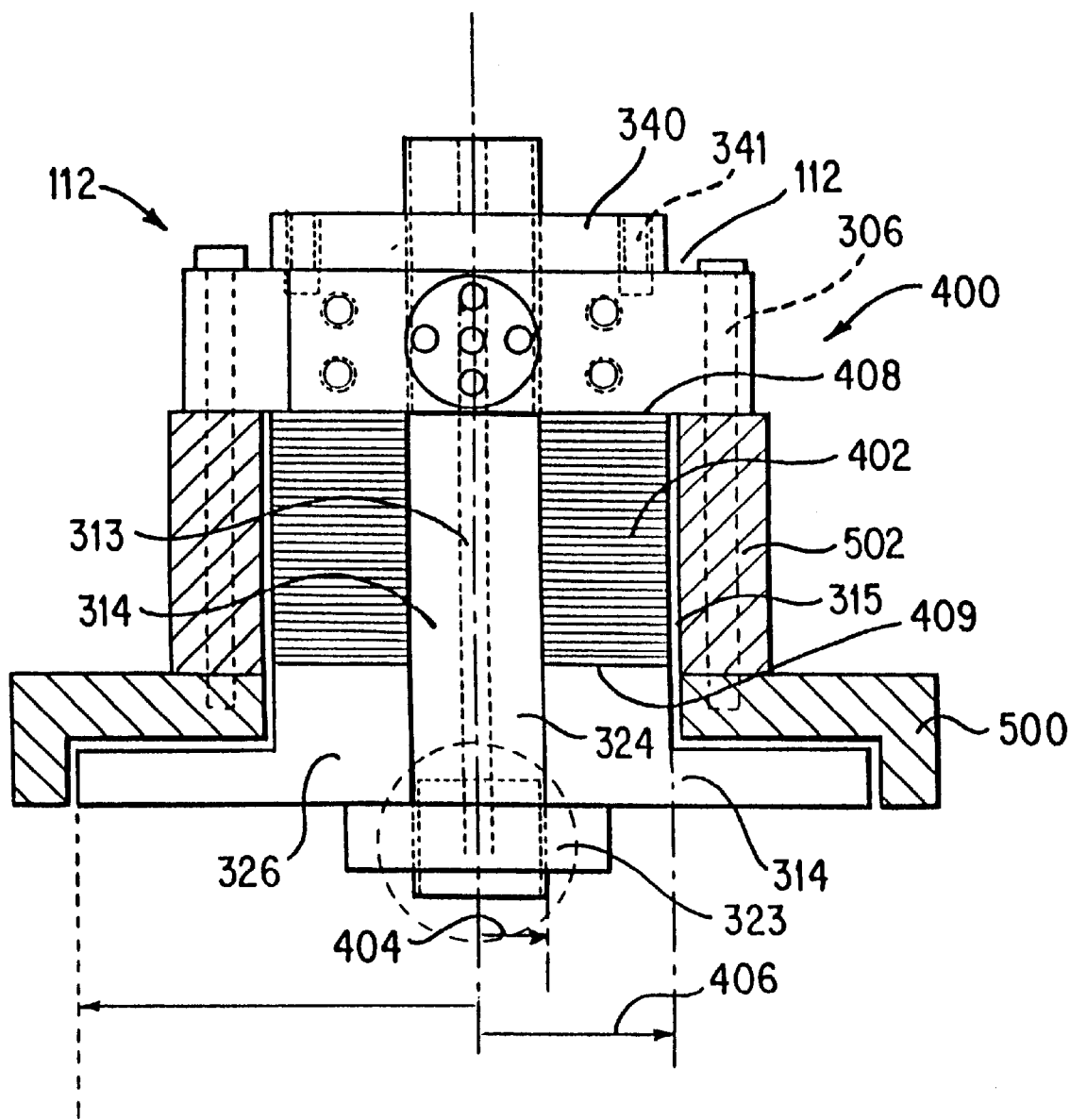
FIG. 11 shows a partially assembled modular disk assembly of FIG. 10.

Alternatively, as illustrated in FIGS. 10–13, the die of the present invention may be configured to direct melt flow radially outward, away from the mandrel 314. As best shown in FIG. 11, an outward flow die 400 includes a modular disk assembly or modular disk 402 with a first end 408 and an opposite second end 409, an overall inner radius 404 and an overall outer radius 406. The modular disk assembly 402 is disposed about a mandrel 314, which includes a mandrel stem 324 and a mandrel tip 326. The surface (not shown) at the inner radius 404 of the modular disk abuts the mandrel stem 324 and the modular disk 402. Similarly, the mandrel tip 326 abuts the second end 409 of the modular disk assembly 402 such that no gap exists there-between. The die 400 also includes an annular die wall 502 connected to an exit die tube 500, both of which surround the modular die assembly such that a peripheral resin passage 315 is formed therebetween. A screw and lock nut design allows for attachment of a mandrel tip with various radii. It is also understood that the exit die tube 500 may also be replaced by one with a different radius in order to obtain a peripheral resin passage 315 with a different width. Die bolts secure the inlet plate 306, annular die wall 500, and exit die tube 502. Recessed holes are in the annular die wall 500 so that the die bolts 112 do not interfere with clamping pressure As best shown in FIG. 10, two melt streams a, b are introduced to a modular die containing a first cell 410, a second cell 420 and a last cell 430. Referring now to FIG. 11, the first cell 410 is adjacent to the first end 408 of the modular disk assembly 402 while the last cell 430 is adjacent to the second end 409. As best shown in FIG. 10, each of these cells includes a first cap disk 412, a distribution disk 414, a second cap disk 416 and a spacer disk 418. Melt stream a is introduced to the first cell 410 through cap inlet opening 350a while melt stream b is introduced the modular disk 402 through cap inlet opening 350b. A selection port 360a of the first cell 410 is aligned with cap inlet opening 350a and thus selects melt a for distribution in the first cell 410. A continuous channel that extends through the distribution disk 362 directs the selected melt material from stream a radially outward to eight outlet openings 364x, 364y that terminate the channel 362. Distribution inlet opening 352b in the first cell 410 is aligned with cap inlet opening 350b and therefore directs melt stream b to the second cell 420 via flow regulation point 366b and spacer inlet opening 372b of the second cap disk 416 and spacer disk 418, respectively, in the first cell 410. The eight cap outlet openings 368x, 368y are aligned with the distribution outlet openings 364x, 364y, so that the selected melt material from stream a is directed to eight flow ports 376x, 376y of the spacer disk 418 in the first cell 410. The selected melt material is then allowed to fill the flow region 374 that surrounds the outer periphery of the spacer disk 418. Referring now to FIG. 11, the selected melt material that fills the flow region 374 then follows the peripheral resin passage 315 and exits the die 400 as a blown film (not shown).

As best shown in FIG. 10, the first cap disk 412 preferably has an outer radius 515 that is greater than the outer radius 525 of the spacer disk 418 so that the flow region 374 extends beyond the points of the eight-star configuration to allow melt material to join in the flow region 374 before it enters the peripheral resin passage 315. The inner radius 510 of all of the disks making up the cells 410, 420, 430 are preferably equal to the overall inner radius 404 so that the modular disk assembly 400 snugly fits around the central core portion of the mandrel 314.

In the preferred embodiment wherein each cell or group of two or more disks is machined from a single piece of material, another configuration may replace the star-shaped spacer disk 418. In this preferred embodiment, the star-shaped spacer disk 418 shown in FIG. 10 may be replaced with a disk having a spiral overflow design such as that shown in FIGS. 15 and 16. A spiral overflow design aids in spreading out melt join lines over an area rather than a discrete and narrow weld line.

Figure 12:
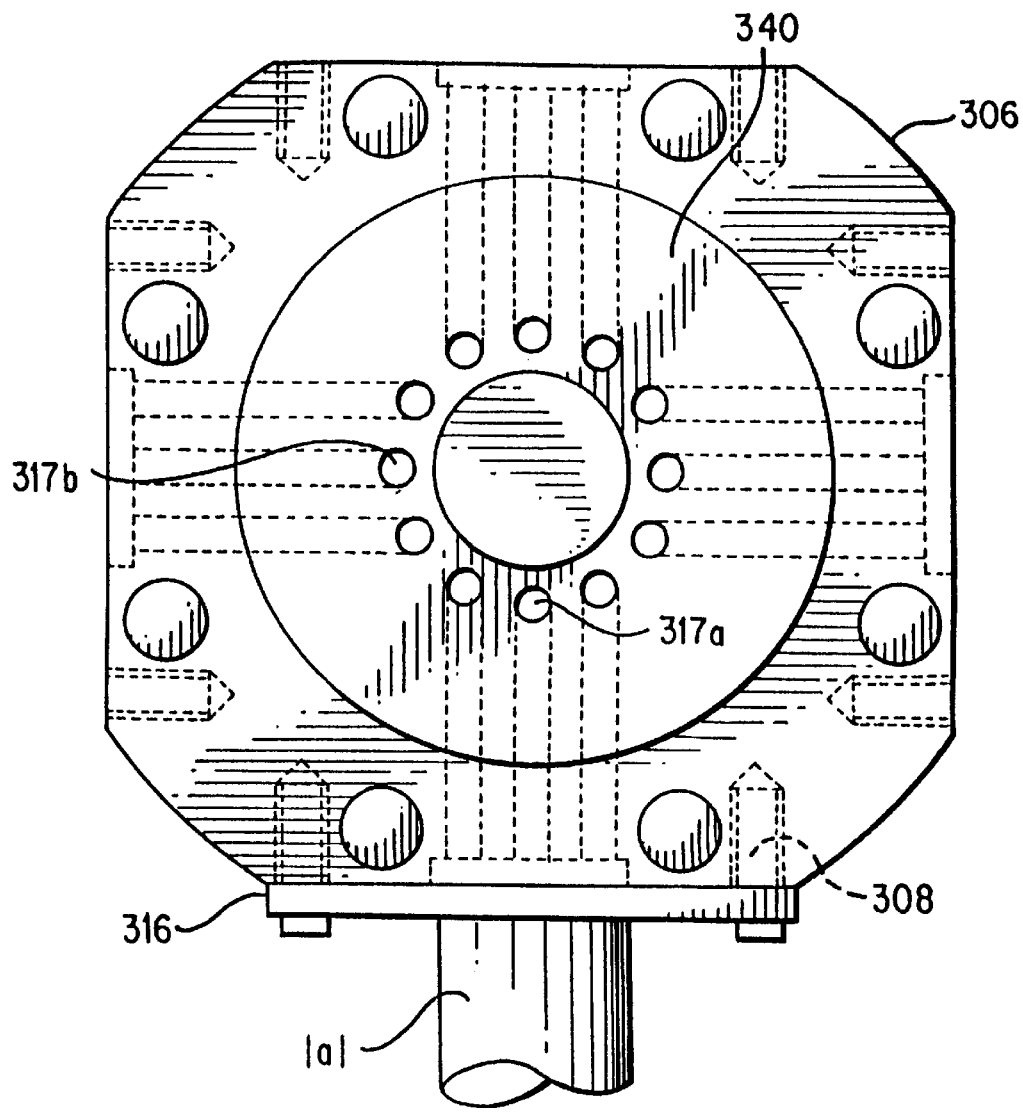
FIG. 12 shows an inlet plate that can be connected to the assembly shown in FIG. 10.
Figure 13:
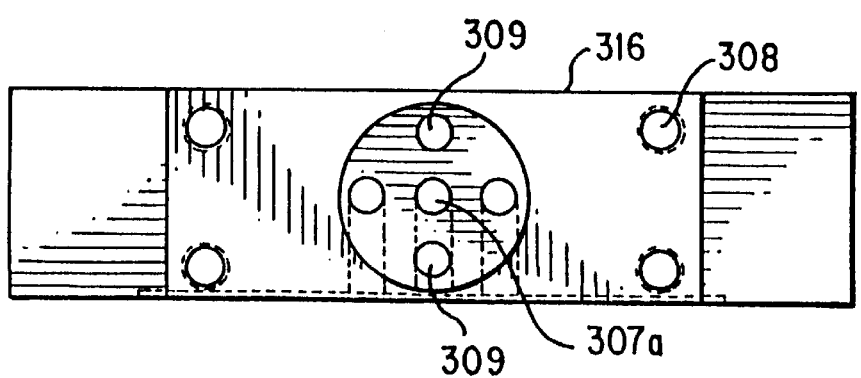
FIG. 13 shows a three-melt threaded attachment plate that is connected to the inlet plate shown in FIG. 12.

The modular disk assembly 402 can be used in the device 100 illustrated in FIG. 1 with the inlet plate 306 shown in FIG. 12 and the threaded attachment plate 316 shown in FIG. 13. FIG. 13 shows the inlet plate 306 that directs melt stream a through melt holes 307a to the modular disk assembly 402. The illustrated stream b is directed to the modular disk through a separate threaded inlet plate (not shown). As best shown in FIG. 12, threaded plate bolts 308 secure the inlet plate 306 with the threaded attachment plate 316. Two pin holes 309 can be used to align the melt hole 307a of the inlet plate 306 to the extruder extension 104 (of FIG. 1). The threaded attachment plate 316 directs the melt streams to the modular disk assembly 402 component of die 400 through inlet holes 317a, 317b.

As with the distribution disks 214, 215 of the inward flow die 202, the melt is preferably divided by symmetric split channels in the annular disks. Particularly, each first split channel 359 preferably directs about one-half of the amount of the selected melt from the selection port 360a to its adjacent two second split channels 361. Similarly, each second split channel 361 directs one-half of the amount of selected melt from the first split channel 359 to its adjacent third split channels 365. A relief zone 363 is preferably provided to allow a momentary rest of the selected melt flow before its flow into the third split channels 365. As previously described, one of eight distribution outlet openings 364 terminates each end of the third split channels 365.

For both inward flow and outward flow dies of the present invention, valving components such as choker rods 800 can be inserted in the channel cavities of the distribution disk in order to facilitate uniform distribution of the melt material. For example, as best shown in FIG. 4, a set of choker rods 800 may be installed in each distribution disk 214 at the third split channel closest to the selection port 260 designate channel legs, as shown for the seventh cell 270. These rods 800 may be made of, for example, rubber or metal wire. Other possible valving components include, for example disks (not shown) that may be placed within one or more relief zones 363.

Because of the thinness of the disks and the cells, the die of the present invention can produce laminate products having a greater number of laminate layers than the conventional die within a given amount of space for the die. In addition, the coplanar feeding of all of the melt streams into the die from one end of the die also eliminates the temperature control problem associated with the conventional die, which requires increased radial thickness for increased melt streams. Furthermore, the extruder delivery design with commonly driven extruders facilitates the ability to deliver multiple melts without taking up a large amount of floor space, because the inlet openings are spaced at 90° around the die and the adapter attached to the die can deliver three or more melts. Moreover, the die is easy to clean because the entire module may be removed. Once removed, the module may be replaced with a new or cleaned module. Replacement is cost-effective, because the disks that make up the module are cheap to manufacture. Also, replacement is not a problem, because assembling the module and installing it into the system are straightforward and simple processes. This replacement and cleaning system enables a wide selection of structures to be inventoried and quickly installed (a feature not present in current conventional dies). The present invention also provides increased versatility to a die. For example, a die of the present invention can produce a first laminate, including a first number of layers having a first thickness as well as a second laminate having a second larger number of layers having the same first thickness, simply with a modular assembly containing more but thinner disks than the assembly used to produce the first laminate. In addition, an inventory of reusable modular setups can be maintained such that, for example, the die can produce an ABA structure with one modular setup, and an ABCD structure simply by switching to another modular setup.

In another preferred embodiment of this invention, a plurality of thin cells comprising sets of thinner disks can be positioned within disks having standard thicknesses. This embodiment permits many tin layers of film to be positioned between two or more standard thicknesses of film. Such an embodiment permits multiple continuous and uninterrupted layers of film. An example of this embodiment would be a film comprising a layer of polydichloroethylene sold under the trade name Saran® (S) positioned between two layers of ethylene vinyl acetate (EVA) to form a film structure of EVA/S/EVA. A film structure according to this preferred embodiment of the invention would replace the single polydichloroethylene layer with a layer of equal thickness comprising a structure of S/EVA/S/EVA . . . EVA/S. One such embodiment would require cells having approximately 0.25" disks positioned among cells having 16 gauge disks.

Other advantages and characteristics of the present invention are illustrated in the following examples.

EXAMPLE 1

The uniformity of distribution of a selected melt was tested using an aerosol can of whipped cream to mimic a plastic melt.

A cell containing four annular disks was assembled. The four disks had the general configurations of the first cell shown in FIG. 4. Each annular disk was made of stainless steel and had a thickness of ⅛ inch, an inner radius of 1 inch and an outer radius of 3 inches. The diameter of the inlet openings (50, 52, 66, 72 of FIG. 4) were ⅜ inches. The diameter of the outlet openings (64, 68 of FIG. 4) were ¼ inches. In the first run no choker rods were used. In the second run, the distribution disk was fit with two choker rods made of 0.070 mil. wire in the positions shown in FIG. 4 (component 800).

It was found that the choker rods 800 allowed for more uniform distribution of the whipped cream.

EXAMPLE 2

Annular disks including first cap disks, distribution disks, second cap disks and spacer disks having the respective configurations shown in FIG. 4 were produced and assembled together. The dimensions and materials of these disks are listed in Table I below.

TABLE I

| Disk | Ref No. (see FIG. 4) | Outer Radius (inches) | Inner Radius (inches) | Thickness of disk (inches) | Material |
|---|---|---|---|---|---|
| first cap disk | 212 | 3 | 1 | 0.060 | steel (16 ga.) |
| distribution disk | 214 | 3 | 1 | 0.060 | aluminum |
| second cap disk | 216 | 3 | 1 | 0.060 | steel (16 ga.) |
| spacer disk | 218 | 3 | N/A | 0.060 | aluminum |

The diameter of the inlet openings (50, 52, 66, 72 of FIG. 4) were ⅜ inches. The diameter of the outlet openings (64, 68 of FIG. 4) were ¼ inches. The dimension of the channels openings and selection port in the distribution disk are listed in Table II below.

TABLE II

| Channels and Ports on Distribution Disk | Ref. No. (see FIG. 4) | Dimension (inches) |
|---|---|---|
| selection port | 60 | ⅜ (diameter) |
| first split channel | 59 | 0.25 (width) |
| second split channel | 61 | 0.1875 (width) |
| third split channel | 65 | 0.125 (width) |
| relief zone | 63 | ⅜ (diameter) |

The first 212 and second 216 cap disks were made through a stamping process by HPL Ohio of Solon, Ohio. Male and female molds were made and then attached to the punch press. A metal sheet was then inserted in between the molds. Full pressure of the press was then exerted and a hole or other shape was cut.

The distribution 214, 215 and spacer disks 218 were produced by Versatile Tool & Die Co. of Ft. Lauderdale, Fla. The configuration on the distribution 214, 215 and spacer disks 218 was produced by a water jet cutting process. Alternatively, tooling for the configuration can be made so that the disks can be made by a stamping process.

It is anticipated that the tinner distribution 214, 215 and spacer disks 218 will at least double the laminate layers that can be made from a die having the space provide as that in Example 1.

EXAMPLE 3

A module assembly 202 containing seven cells of the four disks described in Example 2 was secured with bolts and installed into a die 200 as shown in FIG. 3. The module 202 was inserted into the die 200. The module 202 was clamped in between the inlet plate 106 and exit plate 118 of the die 200 using 8 die bolts 112. The mandrel 114 and annular resin passage 115 were aligned using 4 mandrel bolts 141. The entire process of inserting the module 202 into the die 200 took approximately 1 hour.

Two melt streams were delivered to the module 202. However, it was found that an amount of melt leaked out of the module 202, possibly due to uneven surfacing of the aluminum distribution 214, 215 and spacer disks 218.

The module 202 was disassembled by removing the bolts and thereafter re-secured by gluing according to the following steps: (1) as the module 202 was assembled both the aluminum distribution 214, 215 and spacer disks 218 were coated on both sides with DK-175-022A, a ceramic glaze available from Cerdec Corp. of Washington, Pa.; (2) the assembly stack was pressed in a 12-ton press and the glaze was permitted to dry for 24 hours; (3) the dried glaze assembly was oven baked at 465° F. for about five hours to insure complete curing of the inorganic polymer; (4) the assembled and cured module 202 was then inserted into the die 200. The seven layer ABABABA laminate product was successfully produced without leaks. Therefore, gluing the module 202 improved the poor surface quality of the disks, because the ceramic coating filled in the gaps that caused leaking.

EXAMPLE 4

A modular disk assembly 202 containing seven cells with a total of 29 annular disks was assembled and installed in a die 200 as shown in FIG. 3. The disks had the general configurations shown in FIG. 4. Each annular disk was made of steel and had a thickness of ⅛ inch, an inner radius of 1 inch and an outer radius of 3 inches. The diameter of the inlet openings (50, 52, 66, 72 of FIG. 4) were ⅜ inches. The diameter of the outlet openings (64, 68 of FIG. 4) were ¼ inches. The disks were aligned and secured with bolts. Pre-assembly took about one hour. This pre-assembled modular disk assembly was connected to two 1-¼ inch diameter screw extruders, the first containing a polypropylene melt (A), the second containing a low-density polyethylene melt (B). The modular disk assembly was connected to a mandrel 114 having a radius of 1.75 inches so that a gap is formed between the mandrel and the inner radius of the annular disks. This gap provides an annular axial flow passage 130 for the exit melt. A mandrel tip (126 of FIG. 3) having a diameter of 9 inches was connected to the end of the mandrel that is adjacent to the exit die plate. This was set with a 0.040 gap between the outlet plate 118 and the mandrel tip 126. A seven-layer laminate tube with a 9 inch diameter and having layers in the order of A/B/A/B/A/B/A was made. Each layer was about 0.9 mil thick, and the total film thickness was about 6 mils.

EXAMPLE 5

The 9-inch diameter mandrel tip connected to the modular disk die of Example 4 was replaced with a smaller mandrel tip (2 inches in diameter) and a seven-layer laminate with total laminate layers having a 8-mil thickness was produced. An exit melt tube having a diameter of 4 inches was blown to achieve the result. A set of cooling rings were installed, which resulted in a more controlled run. The laminate layers were individually inspected. The film thickness of each layer varied between a thickness of 0.8 to 1.8 mils, the thicker portion was developed on the inlet side and the thinner portion was observed on the opposite side.

EXAMPLE 6

Two 0.065 inch diameter copper choker rods 800 were inserted into each distribution disk in the system described in Example 5. The position of these rods were as shown in FIG. 4 in the cell 270. The above variation obtained in Example 5 was reduced to a maximum of plus 22.5% and minus 26.5%. Thus, it appears that the greater thickness variation obtained in Example 5 resulted from the nonuniform distribution of the selected melt in the distribution disk of each cell.

EXAMPLE 7

The thickness and uniformity of film produced by the present invention were evaluated. A modular disk assembly of seven cells was assembled. Each cell contained five disks, including two distribution disks placed next to each other. The dimensions and material of these disks are described in Table III below.

TABLE III

| Disk | Ref. No. (see FIG. 4) | Outer Radius (inches) | Inner Radius (inches) | Thickness of each disk (inches) | Material of each disk |
|---|---|---|---|---|---|
| first cap disk | 212 | 3" | 2" | 0.120 | steel (10 ga.) |
| distribution disks (2) | 215 | 3" | 2" | 0.060 | aluminum |
| second cap disk | 216 | 3" | 2" | 0.120 | steel (10 ga.) |
| spacer disk | 218 | 3" | N/A | 0.120 | steel (10 ga) |

Figure 14:
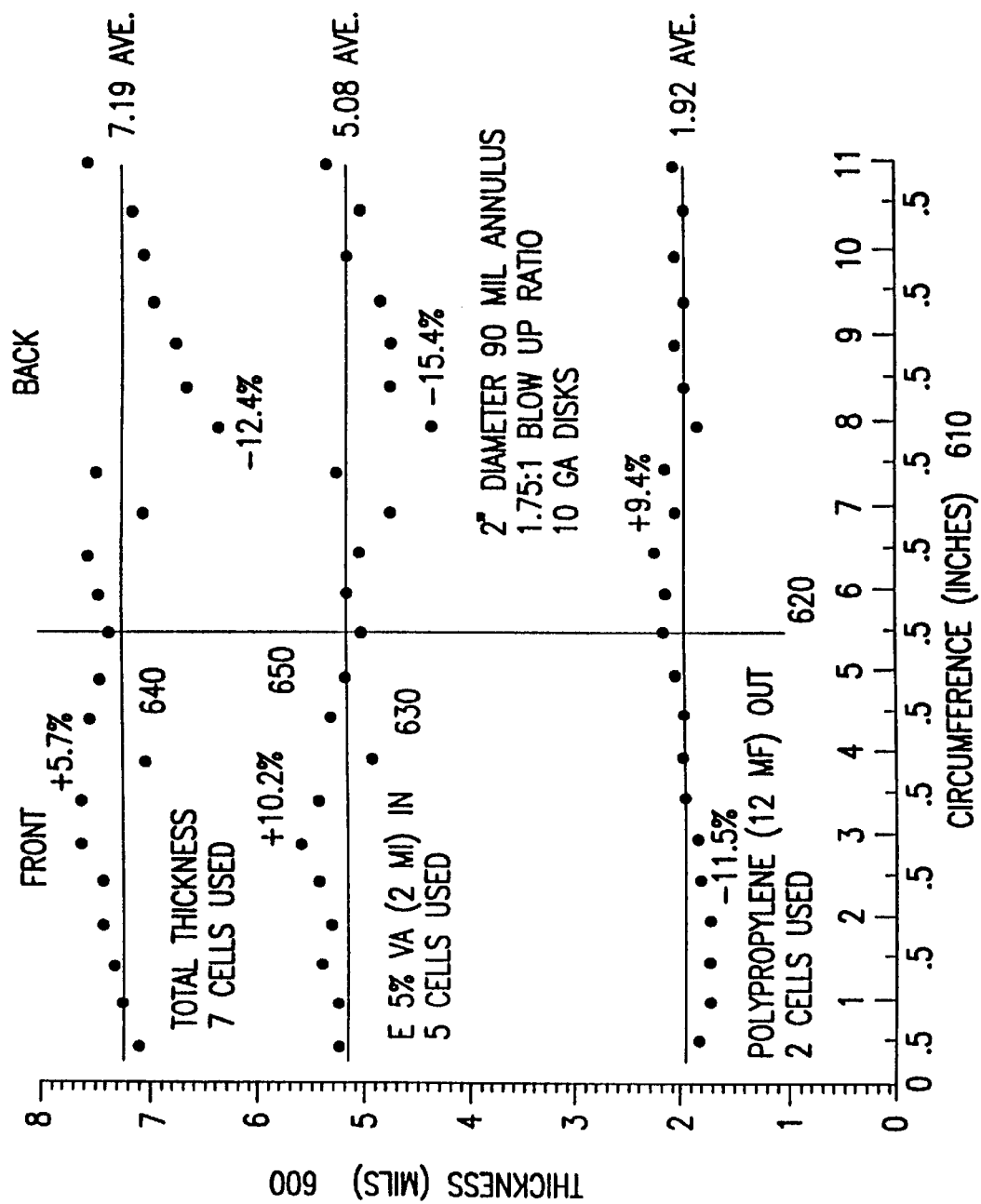
FIG. 14 shows a graph that illustrates the thickness of the laminate layers extruded at various blow up ratios.

The assembly utilized the distribution disk shown in FIG. 9. The cells were stacked so that five cells consecutively ran ethylene vinyl acetate (EVA) (2 MI) as a first layer and two cells consecutively ran polypropylene (PP) (12 MF) as an opposing second layer. Laminate film was blown from a 2-inch mandrel tip with a 0.090 inch gap between the mandrel tip 126 and the outlet plate 118 at approximately a mandrel tip 126 diameter to air inflated tube diameter ratio of about 1.75:1. The circumferences produced are shown in FIG. 14. The total thickness was measured every ½ inch with a Federal 22P-10 gauge. The two layers were then separated and measured individually.

The graph in FIG. 14 depicts the maximum thickness variation of all the measurements. The vertical axis of the graph represents thickness 600 in mils, while the horizontal axis represents circumference 610 in inches. The horizontal line 620 represents the average thickness of the PP layer. The line 630 above the first horizontal line 620 represents the average thickness of the EVA layer 630. The line 640 on FIG. 14 represents the average thickness of all 7 layers. The percentage indications, such as +10.2% on the EVA line 650, indicate maximum deviations and are not averages. The 5 to 15% maximum thickness deviation of the average shows that the performance of the distribution disk shown in FIG. 9 is commercially acceptable.

EXAMPLE 8

A modular die assembly containing 100 cells will be preassembled. Each cell will contain four disks, each disk will be made of a 22 Ga steel having a thickness of 0.030 inches. Thus, the complete assembly will have a height of 12.030 inches. A modular die assembly including 100 cells of four disks with the configuration shown in FIG. 4 using up to 12 melt streams will produce a laminate product containing 100 laminate layers.

EXAMPLE 9

A coextrusion "lab" die with a 2 inch mandrel tip with the disk configuration shown in FIG. 4 will be converted to a "production" die with a 9-inch mandrel tip. Assuming a maximum delivery of 50 pounds per hour through ⅜ inch melt holes in a 2-inch lab die, a modular 9-inch production die will be assembled using larger melt passageways. Melt will be delivered to the die at a rate of 600 pounds per hour and the melt will flow through 12-⅜ inch inlet openings. Thus, the present invention allows a 2 inch coextrusion lab die to be readily converted into a 9 inch production die.

EXAMPLE 10

The cells were stacked so that twenty seven cells consecutively ran ethylene vinyl acetate (E5%VA) and polypropylene (PP) (12 MFR) as alternating layers. Two 1.25" extruders fed the module with inlets alternating from the sources which were 180° opposed. The annular axial flow passage was 0.030". This configuration resulted in 27 layer film but with some melt instability. The film had the configuration $(EVA/PP)_{13}/EVA$.

EXAMPLE 11

The cells were stacked so that twenty seven cells consecutively ran ethylene vinyl acetate (E5%VA) and ethylene vinyl alcohol (EVOH) as alternating layers. Two 1.25" extruders fed the module with inlets alternating from the sources which were 180° opposed. The annular axial flow passage, was 0.030". This configuration resulted in 27 layer film with only slight melt instability. The film had the configuration $(EVA/EVOH)_{13}/EVA$.

EXAMPLE 12

The annular axial flow passage was enlarged from 0.030" to 0.050" to reduce exit shear. Polypropylene (PP) was run against the metal parts of the die to reduce function since some of the polypropylene degrades to an oil and ethylene vinyl acetate does not. The cells were stacked so that twenty seven cells consecutively ran polypropylene (PP) (12MFR) and ethylene vinyl acetate (E5% VA) as alternating layers. Two 1.25" extruders fed the module with inlets alternating from the sources which were 180° opposed. This configuration resulted in 27 layer film without any observed melt instability. The layer of film were continuous and uninterrupted. The film had the configuration $(PP/EVA)_{13}/EVA$.

Therefore, the die of the present invention has the ability to produce coextruded blown film laminate products containing large numbers of layers (e.g. 12, 13, 14, 15, 16, 17, 18, 19, 20, 21, 22, 23, 24, 25, 26, 27 and more) as well as products made up of more than eight separate materials. Such products have not been obtained from an extrusion process before. Additionally, the die has the ability to produce laminate products of various configurations including hollow tubes, solid rods and parisons having large numbers of layers (e.g. 12, 13, 14, 15, 16, 17, 18, 19, 20, 21, 22, 23, 24, 25, 26, 27, and more) as well as such products containing more than eight separate materials. These products of the present invention can be made of any melt material that can be extruded. Suitable materials include thermoplastic materials such as, for example, polyethylene, polypropylene, ethylene vinyl acetate, as well as elastomer materials such as, for example, copolymers of alkenes having from 2 to about 30 carbons in the alkyl chain.

Of course, it should be understood that a wide range of changes and modifications can be made to the embodiments described above. It is therefore intended that the foregoing description illustrates rather than limits this invention, and that it is the following claims, including all equivalents, which define this invention.

What is claimed is:

1. A method of coating a cylindrical object with a die for coextruding at least one resin material to produce a plurality of laminate layers, said die having a modular disk assembly including at least one cell having a plurality of thin annular disks axially adjacent to each other, each of said annular disks having an inner radius and an outer radius and a plurality of openings radially disposed between said inner and outer radius, said modular disk assembly having a first end and an opposite second end; wherein said openings form resin passages through said modular disk assembly such that all of said resin material is coplanarly supplied from said first end, an outlet die plate axially adjacent to said second end, said outlet plate having a disk end and an opposite exit end, said modular disk assembly abutting said disk end; and a mandrel including a mandrel stem and a mandrel tip, said modular disk assembly being circumferentially disposed about said mandrel stem such that an annular exit melt passage is formed between said mandrel stem and said modular assembly, said mandrel stem extending through said outlet plate, said mandrel tip adjacent to said exit end and attached to said mandrel stem such that said mandrel tip and said exit end form a gap therebetween, said method comprising the steps of:

removing said mandrel;

inserting said object into said modular disk assembly from said first end such that said annular exit melt passage is formed between said object and said modular disk assembly;

delivering at least one melt into said modular disk assembly;

directing said melt into said exit melt passage;

allowing said melt to contact said object; and removing said coated object from said second end.

2. The method of claim 1 wherein the plurality of laminate layers comprises at least fifteen layers.

3. The method of claim 1 wherein the plurality of laminate layers comprises at least eighteen layers.

4. The method of claim 1 wherein the plurality of laminate layers comprises at least twenty-one layers.

5. The method of claim 1 wherein the plurality of laminate layers comprises at least twenty-four layers.

6. The method of claim 1 wherein the plurality of laminate layers comprises at least twenty-seven layers.

7. The method of claim 1 wherein the plurality of laminate layers comprises at least twelve layers.

* * * * *